United States Patent Office 2,961,146
Patented Nov. 22, 1960

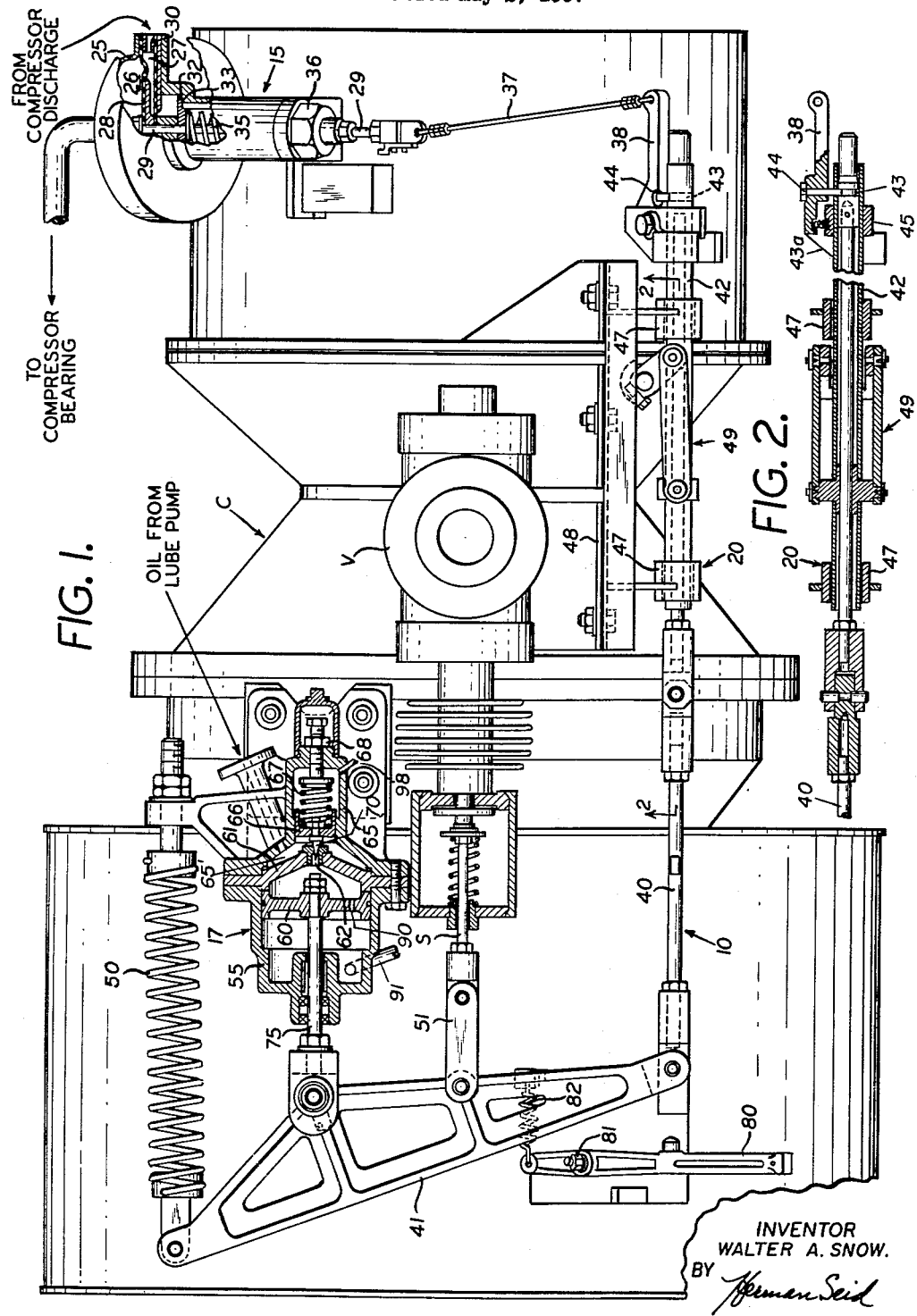

2,961,146

CONTROL MECHANISM FOR FLUID MACHINE

Walter A. Snow, De Witt, N.Y., assignor to Carrier Corporation, Syracuse, N.Y., a corporation of Delaware Filed May 2, 1957, Ser. No. 656,610

8 Claims. (Cl. 230—5)

This invention relates to a novel control system, more particularly to a control system specifically adapted for regulating the operation of a mechanism for converting energy into mechanical work.

With the development of high speed mechanisms of the type described, the problems of regulating and controlling the mechanism have increased. As in the case of all mechanisms having moving parts, it is desirable to provide some means for controlling the speed at which the components of said mechanisms move. Speed control is essential in order to maintain the machine functioning within the stress limits of its components. Additionally, with high speed machinery where lubrication is employed to minimize wear and to increase facility of operation, it is further desirable to control the speed of operation of the machine as a function of the presence of the lubricant, and within ranges which will permit the lubricant to flow without breakdown over the lubricated surfaces. A variety of speed limiting governors have been employed in the past. These conventional governors generally operate to control the mechanism purely as a function of the speed thereof. Thus the conventional flyball governor, employed in connection with steam engines, regulates the flow of steam to the cylinders of the engine as a function of the speed of rotation of the engine crank shaft. A variety of electrical systems have also been employed in conjunction with steam engines and internal combustion engines to maintain the operation of said engines within given speed ranges. Where lubrication factors are a problem, a variety of lubricant sensing apparatus has been employed to stop the mechanism upon the absence of lubricant.

With high speed steam turbines, the conventional speed control structures above generally referred to are found to have certain disadvantages such as excessive cost in applications where the operating condition of the apparatus is subject to frequent manipulation. Where other conventional governor techniques are employed, the complexity of the system and the general inability to control speed as a function of more than one factor, e.g. speed, or lubricant condition, make these conventional speed controls undesirable for high speed steam turbine usage.

Additional difficulties with the previously available control devices arise from the fact that conventional controls are activated in response to a single factor occurring under any given operating condition. Thus, the conventional lubricant sensing apparatus merely responds to a condition in the lubrication system, without regard to the need of the entire mechanism for the lubricant.

In high speed mechanisms, it has been found desirable to provide some means for maintaining speed within given limits, and at the same time insuring proper lubricating conditions for given speeds. Speed per se can generally be controlled by regulating the energy input, and the apparatus may be kept functioning during the regulating operation. However, where there is a failure in the lubricant system, or a lubricating condition inadequate for any given speed, it is essential that the mechanism be stopped so as to prevent damage to the components thereof.

It is with the above problems in mind that the present means have been evolved, means providing a mechanism control system which is responsive to an interrelationship of factors which must be maintained in order to insure proper functioning of the mechanism.

The novel means provide for controlling the mechanism in operation at a given speed, and further serve to shut down the mechanism upon the occurrence of an inadequate lubricant condition.

It is accordingly a primary object of this invention to provide an improved control.

An additional object of this invention is to provide a control for regulating the functioning of a mechanism in response of any interrelationship between two or more factors affecting said mechanism.

A further object of the invention is to provide an improved control specifically adapted for high speed mechanisms to insure the operation of said mechanisms within desirable speed ranges, and under proper conditions of lubrication.

These, and other objects of the invention which will become apparent in the following disclosure and claims, are achieved by provision of a novel control system, controlling the flow of energy input to a mechanism, and thus controlling the speed of the mechanism. The operation of this control system is made responsive to at least two factors, namely: speed of the controlled mechanism; and lubricant pressures in said mechanism. In the preferred embodiment here disclosed the controlled mechanism is a turbo-compressor. It is understood that the term turbo-compressor includes compressors and blowers. The turbo-compressor here shown is a turbine-driven blower, in which the energy input, an impelling fluid, is supplied through a valve. The opening or closing of this valve to regulate impelling fluid flow and hence compressor speed is regulated by the novel control system which comprises: a pressure differential sensing safety trip device and a speed responsive assembly. The safety trip device is responsive to the relative pressures exerted by the compressor discharge, and the lubricant pressures in the compressor bearings. The speed responsive assembly provided is affected by the pressures exerted by the lubricant pump which is driven at a speed proportional to that of the turbo-compressor. This speed responsive assembly, and pressure differential sensing device are interconnected to each other and to the valve by a control linkage which permits the speed responsive assembly to regulate the speed of the turbo-mechanism, and permits the pressure differential sensing device to control valve position in response to lubricant conditions at any given speed.

A primary feature of this invention resides in the provision of a linkage for controlling a valve member with said linkage responding to differential conditions existing at two points of a system controlled by said valve.

The specific constructional details of a preferred embodiment of this invention and their mode of operation will be made most manifest and particularly pointed out in conjunction with the accompanying drawings, wherein:

Figure 1 is a schematic view, with parts in cross-section revealing the novel features and interrelationships of the sensing members, and the control linkage whose operation is effected by said sensing members; and Figure 2 is a cross-sectional view on lines 2—2 through a portion of the control linkage of Figure 1.

Referring now more particularly to the drawings, like numerals in the various figures will be taken to designate like parts.

The novel control structure 10 here provided, comprises a pressure differential sensing safety trip device 15 (as best seen to the right in Figure 1); and a pressure sensing speed responsive assembly 17, (as best seen to the left in Figure 1); and a control linkage 20 interconnecting said speed responsive assembly and safety trip device, whereby the factors affecting said device and assembly will determine the operation of the controlled mechanism.

Control structure 10. as will become hereinafter more apparent, may be employed in conjunction with a variety of mechanisms to regulate speed and lubrication of said mechanisms. However, as here illustrated, the control structure is shown in a preferred embodiment as applied to control speed and lubrication of a turbo-mechanism, more particularly a high speed air blower.

As applied to controlling a high speed air blower C, the control structure is arranged (as best seen in Figure 1) so that pressure differential sensing safety trip device 15 is connected to a lubrication system of the blower C at one of its bearings. Another connection is made to the discharge air duct from the blower.

As best seen in Figure 1, this pressure differential sensing safety trip device 15 comprises a housing 25 having an upper chamber 26 to which the lubrication oil from the compressor bearings is fed, and a lower chamber 27 to which the discharge air from the blower is fed. Between chambers 26 and 27, a flexible diaphragm 28 is positioned to separate the bearing oil from the discharge air. Secured to diaphragm 28 is a diaphragm rod 29, which moves with said diaphragm. Diaphragm rod 29 extends downwardly through the diaphragm, through lower chamber 27 and through lower chamber housing plate 30. Appropriate sealing means are provided about diaphragm rod 29 to prevent leakage of air from chamber 27. Beneath chamber 27, check plate 32 bearing against stop 33 of the housing is provided to limit the downward motion of rod 29 and diaphragm 28. Upward motion of diaphragm 28 and rod 29 is limited by check plate 32 engaging sealing plate 30. Bearing against the lower surface of check plate 32 and forcing it upwardly, is a compression spring 35 mounted within the housing 25. It is thus seen that the bearing oil pressure within upper chamber 26 must be balanced by the pressures exerted by spring 35 and the air pressure in lower chamber 27, in order for the diaphragm to attain a position of static equilibrium.

Diaphragm rod 29 extends downwardly from the spring portion of housing 25 (as viewed in the drawing). Adjusting nut 36 about the lower end of rod 29 may be employed to regulate the compression of spring 35 and the pressure exerted thereby. The portion of rod 29 extending through nut 36 is secured to a flexible cable 37. The opposite end of flexible cable 37 is attached to a trip lever 38, forming part of control linkage 20.

Control linkage 20 comprises a connecting rod assembly 40, pivotally secured at one end to a control beam 41. The other end of connecting rod assembly 40 rides within sleeve 42. The remote end of connecting rod assembly 40 within sleeve 42 is notched at 43 for engagement by latch 44 on trip lever 38. Trip lever 38 is pivotally secured by means of yoke 43a to lever bushing 45 to sleeve 42. Sleeve 42 is slidably mounted in bushings 47 on bracket 48, fixedly secured to compressor C. The position of sleeve 42 is generally fixed by means of manual control linkage 49, secured at one end to the sleeve and at its other end to some manual control member. Obviously, the positioning of linkage 49 determines the positioning of sleeve 42, for a purpose to become hereinafter more apparent. Control beam 41 is acted on at its end, remote from connecting rod assembly 40, by tension spring 50, which exerts a pull to the right on beam 41, as viewed in Figure 1.

A high speed air compressor of the type here employed is driven by steam supplied through valve V. The position of valve V is determined by valve stem S. This valve stem S is pivotally secured by valve linkage 51 to control beam 41.

Speed responsive assembly 17 comprises a primary cylinder 55 within which a piston 60 is constrained to move. A cylinder head wall 61 closes off said cylinder encasing the piston. A valved inlet aperture 62 admits fluid from the lubrication pump to the cylinder to act on piston 60. A secondary cylinder 65 is arranged adjacent cylinder head wall 61. Within secondary cylinder 65, a secondary piston 66 is secured to a valve 70 controlling the flow of fluid through said aperture 62. Secondary piston 66 is forced to the left, as viewed in Figure 1, to close aperture 62 by means of compression spring 67 bearing against piston 66. The pressure exerted by spring 67 is adjustable by means of regulating assembly 68. Secondary cylinder 65 is filled with fluid from the lubricating pump providing lubricant for the blower bearings. Line 98 permits fluid trapped to the right of piston 66 to drain off. The pump (not shown) is geared to the turboblower shaft to move at a speed directly proportional thereto. A piston rod 75 of primary piston 60 extends through appropriate sealing from primary cylinder 55 and is pivotally secured to control beam 41.

A reset lever 80 shown at the lower left of Figure 1 may be employed for repositioning control linkage 20 to operative position for a purpose to become hereinafter more apparent. Reset lever 80 is pivoted at 81 to a fixed portion of the structure and is spring biased away from the end of connecting rod assembly 40 by means of spring 82. It will be seen that manual motion of lever 80 against connecting rod assembly 40 causes the assembly 40 to move to the right as viewed in Figure 1.

The novel control structure here provided has been shown as applied to a high speed air compressor C. Control structure 10 functions to regulate the speed of the air compressor and maintain same within given limits. Additionally, means are provided for ensuring the presence of adequate lubrication under any speed conditions.

The speed of the compressor is determined by the amount of driving fluid, in this case steam, permitted to pass through valve V. The opening and closing of valve V, which regulates the flow of steam, is dependent on the position of valve stem S.

When the compressor is operating properly, within given speed ranges, and with adequate lubrication provided at the bearings of said compressor, control linkage 20 will be in the position shown in Figure 1. Connecting rod assembly 40 will be maintained in a relatively fixed position with latch 44 engaging notch 43. This relatively fixed position of the connecting rod assembly is manually adjustable by means of linkage 49 so as to relatively fix the position of pivot connection between control beam 41 and connecting rod assembly 40.

Under these conditions, control beam 41 will pivot about the relatively fixed pivot between control beam 41 and connecting rod assembly 40. Spring 50 biases control beam 41 to rotate in a clockwise direction, and thus primary piston 60 will assume its limiting position, as viewed in the drawing.

The oil from the lubricating pump admitted to secondary cylinder 65 is under a pressure directly proportional to the speed of the compressor, since the lubricating pump is geared to the compressor shaft. When the speed of the compressor shaft increases beyond a certain limit, the oil pressure acts against spring 67 to open aperture 66, permitting the flow of oil into primary cylinder 55 against piston 60 to force piston rod 75 against control beam 41, which moves the control beam 41 in a counterclockwise direction about its lowermost pivot, thus pulling valve linkage 51 to act on valve stem S to close valve V, thus decreasing the flow of steam and the speed of the compressor. As the speed returns to its safe limits, the oil pressure fed to secondary cylinder 65 decreases and spring 50 forces the parts to assume their original position. Oil trapped in valve 17 escapes through orifice 90 and drain line 91.

Though the speed of the compressor may readily be regulated by means of pressure sensing speed responsive assembly 17, as above described, there is no way of assuring adequate lubrication at the bearings of this compressor within the speed range provided by assembly 17. In order to insure adequate lubrication at any given speed less than that at which speed responsive assembly 17 is effective, pressure differential sensing device 15 is employed.

In operation, the lubricant oil from the bearings acts on control diaphragm 28 against the pressure exerted by the discharge air in lower chamber 27, and that of spring 35. Since pressure exerted by spring 35 may be adjusted by means of adjusting nut 36, device 15 may be set to provide for a given lubricant pressure at any given speed. When the lubricant pressure is sufficient to compensate the air pressure, which is a function of compressor speed, control linkage 20 remains in the illustrated position. In the event, however, that lubricant pressure drops, the air pressure acting on diaphragm 28 forces diaphragm rod 29 upwardly to pull trip lever 38, to disengage latch 44 from the notch 43 of connecting rod assembly 40 Under these circumstances, spring 50 pulls control beam 41 in a clockwise direction about the pivot connection between beam 41 and piston rod 75 to close valve V, thus stopping the compressor.

Since failure of lubrication requires immediate shutdown, this last described structure must be manually reset. This is accomplished by means of reset lever 80.

While I have described a preferred embodiment of my invention, it will be understood that my invention is not limited thereto since it may be otherwise embodied within the scope of the following claims:

I claim:

1. In a fluid driven mechanism having a fluid output, a driving fluid supply line, a valve in the line, lubrication points, and a lubrication system fed by a pump driven at a speed proportional to that of the mechanism, means for controlling the operation of said mechanism, said means comprising a pressure differential sensing device, said device coupled to and acted on by the fluid output and the lubricant at the lubrication points, a pressure sensing assembly coupled to and acted on by the lubricant pump output and a control linkage interconnecting said device and said assembly with the valve to regulate the position thereof, whereby mechanism operation is maintained within desired speed limits and speed is controlled to accommodate lubrication conditions.

2. Apparatus as in claim 1 in which said pressure differential sensing device comprises a movable diaphragm with the fluid output acting on one face thereof and the lubricant acting on the other face thereof, and a connecting member extending from said diaphragm to said control linkage.

3. Apparatus as in claim 1 in which said assembly comprises a movable piston acted on by the lubricant pump output and a connecting piston rod between said piston and the valve to regulate the position of the valve in response to pump pressure.

4. Apparatus as in claim 3 in which said pressure differential sensing device comprises a movable diaphragm with the fluid output acting on one face thereof and the lubricant acting on the other face thereof, and a connecting member extending from said diaphragm to said control linkage.

5. In a fluid driven turbo-mechanism having a fluid output, a driving fluid supply line, a valve in the line and a bearing lubrication system fed by a pump driven at a speed proportional to that of the turbo-mechanism, means for controlling the operation of said turbo-mechanism, said means comprising a pressure differential sensing safety trip device, said device coupled to and acted on by the fluid output and the bearing lubricant, a pressure sensing speed responsive assembly coupled to and acted on by the lubricant at the pump and a control linkage interconnecting said device and assembly with the valve to regulate the position thereof.

6. Apparatus as in claim 5, in which said sensing device comprises a movable diaphragm with the fluid output acting on one face thereof, and the lubricant acting on the other face thereof, and a connecting member extending from said diaphragm, and a safety trip latch coupled to said control linkage to permit same to move to a position to close said valve to stop said mechanism upon the occurrence of an undesirable relationship between the factors.

7. Apparatus as in claim 5, in which said pressure assembly comprises a movable piston acted on by the lubricant pump output and a connecting piston rod extending from said piston, a control beam coupled to said piston rod and forming part of the control linkage, whereby the effect of said sensing device is dependent on said assembly.

8. In a fluid driven turbo-mechanism having a fluid output, a driving fluid supply line, a valve in the line, bearings and a bearing lubrication system fed by a pump driven at a speed proportional to that of the turbo-mechanism, means for controlling the operation of said turbo-mechanism, said means comprising a control beam coupled to the valve to regulate the position thereof, a spring biasing said beam to open said valve, a pressure sensing speed responsive assembly coupled to and having a piston acted on by the lubricant output of the pump, the piston of said assembly coupled to said beam to move same against the spring to close the valve as pump output increases, a pressure differential sensing safety trip device, said device coupled to and having a diaphragm acted on by the fluid output, and bearing lubricant, a control linkage between said device and said beam and a latch maintaining said linkage in a given position when the diaphragm is statically balanced.

References Cited in the file of this patent
UNITED STATES PATENTS

| | | |
|---|---|---|
| 1,655,683 | Standerwick | Jan. 10, 1928 |
| 1,729,692 | Standerwick | Oct. 1, 1929 |
| 1,837,382 | Waller | Dec. 22, 1931 |
| 1,844,954 | Good | Feb. 16, 1932 |
| 2,042,374 | Wunsch et al. | May 26, 1936 |